(12) United States Patent
Willey

(10) Patent No.: US 6,889,067 B2
(45) Date of Patent: May 3, 2005

(54) METHOD FOR DETERMINING WHETHER TO WAKE UP A MOBILE STATION

(75) Inventor: W. Daniel Willey, Arlington Heights, IL (US)

(73) Assignee: Motorola, Inc., Schaumburg, IL (US)

(*) Notice: Subject to any disclaimer, the term of this patent is extended or adjusted under 35 U.S.C. 154(b) by 795 days.

(21) Appl. No.: 09/938,323

(22) Filed: Aug. 23, 2001

(65) Prior Publication Data

US 2002/0025811 A1 Feb. 28, 2002

Related U.S. Application Data

(62) Division of application No. 09/258,985, filed on Feb. 26, 1999, now Pat. No. 6,505,058.
(60) Provisional application No. 60/111,024, filed on Dec. 4, 1998.

(51) Int. Cl.[7] .............................. H04B 1/38; H04M 1/00
(52) U.S. Cl. .................... 455/574; 455/442; 455/343.2; 455/434; 455/412.2
(58) Field of Search .............................. 455/574, 412.2, 455/40, 434, 572, 515, 442, 436, 437, 553.1, 420, 343.2, 343.3, 343.5, 517, 458, 419, 69, 522; 340/7.32, 7.33

(56) References Cited

U.S. PATENT DOCUMENTS

| 5,404,355 A | 4/1995 | Raith |
| 5,539,921 A | 7/1996 | Tayloe |
| 5,625,876 A | 4/1997 | Gilhousen et al. |
| 5,745,860 A | 4/1998 | Kallin |
| 5,752,202 A * | 5/1998 | Obright ........................ 455/574 |
| 5,761,618 A | 6/1998 | Lynch et al. |
| 5,761,622 A | 6/1998 | Priest |
| 5,768,276 A | 6/1998 | Diachina et al. |
| 5,794,137 A | 8/1998 | Harte |
| 6,029,065 A | 2/2000 | Shah |
| 6,047,071 A | 4/2000 | Shah |
| 6,101,173 A | 8/2000 | Bayley |
| 6,111,865 A * | 8/2000 | Butler et al. ................. 370/335 |
| 6,137,772 A | 10/2000 | Turcotte et al. |
| 6,178,164 B1 * | 1/2001 | Wang et al. ................... 455/438 |
| 6,195,551 B1 * | 2/2001 | Kim et al. ..................... 455/436 |
| 6,212,398 B1 | 4/2001 | Roberts et al. |
| 6,381,235 B1 * | 4/2002 | Kamel et al. ................. 370/342 |

FOREIGN PATENT DOCUMENTS

| EP | 0 939 569 A1 | 9/1999 |
| WO | WO95 12931 A1 | 5/1995 |
| WO | WO99 67972 A1 | 12/1999 |
| WO | WO00 30394 A1 | 5/2000 |

* cited by examiner

Primary Examiner—Nick Corsaro
Assistant Examiner—John J Lee
(74) Attorney, Agent, or Firm—John B. MacIntyre (57) ABSTRACT

The present invention provides a method for determining whether to wake up a mobile station. The mobile station includes first configuration parameters relating to a base station. The method includes the steps of receiving a configuration change indicator at the mobile station. The configuration change indicator is indicative that the first configuration parameters relating to the base station are different than second configuration parameters that currently relate to the base station. The method further includes waking up the mobile station to receive the second configuration parameters.

16 Claims, 5 Drawing Sheets

FIG. 1

-PRIOR ART-

| APPLICATION | N | DECORR | RETURN VALUE |
|---|---|---|---|
| CDMA CHANNEL NUMBER | NUMBER OF CHANNELS IN LAST CDMA CHANNEL LIST MESSAGE (UP TO 10) | 0 | R+1 |
| PAGING CHANNEL NUMBER | $PAGE\_CHAN_s$ FROM SYSTEM PARAMETERS MESSAGE (UP TO 7) | 2×HASH_KEY[0...11] | R+1 |
| QUICK PAGING CHANNEL NUMBER | $NUM\_QPCH_s$ FROM EXTENDED SYSTEM PARAMETERS MESSAGE (UP TO 7) | 2×HASH_KEY[0...11] | R+1 |
| PAGING SLOT NUMBER | 2048 | 6×HASH_KEY[0...11] | R |
| ACCESS CHANNEL PN RANDOMIZATION | $2^{PROBE\_PN\_RAN_s}$ WHERE $PROBE\_PN\_RAN_s$ IS FROM ACCESS PARAMETERS MESSAGE (UP TO 512) | 14×HASH_KEY[0...11] | R |
| PAGING INDICATOR POSITION | 380 (FOR 9600 BPS), OR 188 (FOR 4800 BPS) | $ECORR_1=[t/64]$ $MOD\ 2^{16}$, $DECORR_2=[t/64+1]$ $MOD\ 2^{16}$, WHERE t IS THE SYSTEM TIME IN FRAMES | $R_1$ AND $R_2$ |

*FIG. 6*

| QPCH_POWER_LEVEL FIELD (BINARY) | TRANSMIT POWER LEVEL |
|---|---|
| 000 | 3dB BELOW THE PILOT CHANNEL TRANSMIT POWER |
| 001 | 2dB BELOW THE PILOT CHANNEL TRANSMIT POWER |
| 010 | 1dB BELOW THE PILOT CHANNEL TRANSMIT POWER |
| 011 | SAME AS THE PILOT CHANNEL TRANSMIT POWER |
| 100 | 1dB ABOVE THE PILOT CHANNEL TRANSMIT POWER |
| 101 | 2dB ABOVE THE PILOT CHANNEL TRANSMIT POWER |
| 110-111 | RESERVED |

*FIG. 7*

METHOD FOR DETERMINING WHETHER TO WAKE UP A MOBILE STATION

CROSS-REFERENCE TO RELATED APPLICATION

This application is a continuation of U.S. patent application Ser. No. 09/258,985, filed Feb. 26, 1999, now U.S. Pat. No. 6,505,058 issued on Jan. 7, 2003, which claims benefit of provisional application 60/111,024 Dec. 4, 1998.

FIELD OF THE INVENTION

The present invention relates generally to communication systems, and more particularly, to a method for determining whether to wake up a mobile station.

BACKGROUND OF THE INVENTION

In order to ensure that stored configuration parameter values are always up-to-date after idle handoffs, current cdma2000 procedures require that a mobile station always wake up for the regular Paging Channel (PCH) following an idle handoff, as described in section 2.6.2.1.4.2 of TR45.5.2.3.SIG/98.12.01.02. Experience with current CDMA systems shows that idle handoffs are typically frequent in areas with multiple pilots. Since the Quick Paging Channel (QPCH) is bypassed following an idle handoff, there is no standby time improvement due to the QPCH for the first paging channel slot following an idle handoff.

In order to ensure that stored configuration parameter values are up-to-date for mobile stations monitoring the QPCH paging indicator bits, the base station, after updating the overhead configuration information, sets all QPCH paging indicator bits to "ON" for an amount of time which is a function of the maximum slot cycle index. For example, in current systems, the base station sets all QPCH paging indicator bits to "ON" for 1.28 seconds if the maximum slot cycle index is set to 0. This is described in TR45.5.2.3.SIG/98.11.17.07, TR45.5.2.3.SIG/98.11.17.08, and TR45.5.2.3.SIG/98.11.18.06.

However, if a mobile station were monitoring another base station when the configuration information for a base station changed and then the mobile station were to perform an idle handoff to the base station, monitoring the QPCH paging indicator bits would not cause the mobile station to update its stored configuration parameter values.

Thus, a need exists for an improved method for ensuring up-to-date stored configuration parameter values after idle handoffs.

DETAILED DESCRIPTION OF A PREFERRED EMBODIMENT

The present invention provides a method for determining whether to wake up a mobile station. The mobile station includes first configuration parameters relating to a base station. The method comprises the steps of receiving a configuration change indicator at the mobile station. The configuration change indicator is indicative that the first configuration parameters relating to the base station are different than second configuration parameters that currently relate to the base station. The method further comprises waking up the mobile station to receive the second configuration parameters.

According to the standard TIA/EIA-95-B's paging channel monitoring procedures, a mobile station preferably determines whether its configuration parameter values are up-to-date by checking the CONFIG_MSG_SEQ field in the General Page Message. It should be understood that the term "page" can refer to a paging message, such as a general page message, or any other message directed to the mobile station. Alternately, the mobile station determines whether its configuration parameter values are up-to-date by checking in another message when it wakes up for its paging channel slot. If the CONFIG_MSG_SEQ does not match the mobile station's stored value, the mobile station stays awake for a longer amount of time to receive new configuration parameter values.

The Paging Channel is preferably divided into 80 ms slots called Paging Channel slots. Paging and control messages for a mobile station operating in the non-slotted mode can be received in any of the Paging Channel slots; therefore, the non-slotted mode of operation requires the mobile station to monitor all slots. A mobile station operating in the non-slotted mode shall monitor the Paging Channel at all times.

During operation in the slotted mode, the mobile station preferably ensures that its stored configuration parameter values are current as shown below. The mobile station will preferably not operate in the slotted mode if its configuration parameters are not current.

The overhead messages on the Paging Channel are preferably:

System Parameters Message
Access Parameters Message
Neighbor List Message
CDMA Channel List Message
Extended System Parameters Message
Global Service Redirection Message
Extended Neighbor List Message
General Neighbor List Message The Response to Overhead Information Operation is preferably performed whenever the mobile station receives an overhead message. The mobile station updates internally stored information from the received message's data fields. Configuration parameters and access parameters are received in the configuration messages and the Access Parameters Message. The configuration messages are preferably:

System Parameters Message
Neighbor List Message
CDMA Channel List Message

Extended System Parameters Message
Global Service Redirection Message
Extended Neighbor List Message
General Neighbor List Message Associated with the set of configuration messages sent on each Paging Channel is a configuration message sequence number (CONFIG_MSG_SEQ). When the contents of one or more of the configuration messages change, the configuration message sequence number is preferably incremented. For each of the configuration messages received, the mobile station stores the configuration message sequence number contained in the configuration message (SYS_PAR_MSG_SEQ$_s$, NGHBR_LIST_MSG_SEQ$_s$, EXT_NGHBR_LST_MSG_SEQ$_s$, GEN_NGHBR_LST_MSG_SEQ$_s$, CHAN_LIST_MSG_SEQ$_s$, EXT_SYS_PAR_MSG_SEQ$_s$, or GLOB_SERV_REDIR_MSG_SEQ$_s$). The mobile station also stores the most recently received configuration message sequence number (CONFIG_MSG_SEQ$_s$) contained in any message. The mobile station examines the stored values of the configuration message sequence numbers to determine whether the configuration parameters stored by the mobile station are current.

The configuration message sequence number is also included in the General Page Message. This allows the mobile station to determine whether the stored configuration parameters are current without waiting for a configuration message. Access Parameters Messages are independently sequence-numbered by the ACC_MSG_SEQ field. The mobile station preferably stores the most recently received Access Parameters Message sequence number (ACC_MSG_SEQ$_s$).

The mobile station preferably stores the configuration parameters from Paging Channels it has recently monitored. When a mobile station starts monitoring a Paging Channel that it has recently monitored, the mobile station can determine whether the stored parameters are current by examining the CONFIG_MSG_SEQ$_s$ in a configuration message or a General Page Message. The mobile station uses a special value, NULL, to be stored in place of sequence numbers for messages that have not been received or are marked as not current. The special value NULL shall be unequal to any valid message sequence number. The mobile station considers the stored configuration parameters to be current only if all of the following conditions are true:

All stored configuration message sequence numbers (SYS_PAR_MSG_SEQ$_s$, NGHBR_LIST_MSG_SEQ$_s$, EXT_NGHBR_LIST_MSG_SEQ$_s$, CHAN_LIST_MSG_SEQ$_s$, EXT_SYS_PAR_MSG_SEQ$_s$, GEN_NGHBR_LIST_MSG_SEQ$_s$ an GLOB_SERV_REDIR_MSG_SEQ$_s$s) are equal to CONFIG_MSG_SEQ$_s$; and CONFIG_MSG_SEQ$_s$ is not equal to NULL; and No more than 600 seconds have elapsed since the mobile station last received a valid message on the Paging Channel for which the parameters were stored.

If the configuration parameters are not current, the mobile station preferably processes the stored parameters upon receipt of the configuration messages.

Whenever a System Parameters Message is received on the Paging Channel, the configuration message sequence number, CONFIG_MSG_SEQ$_r$, is preferably compared to that stored in SYS_PAR_MSG_SEQ$_s$. If the comparison results in a match, the mobile station preferably ignores the message. If the comparison results in a mismatch, then the mobile station processes the remaining fields in the message. If the comparison results in a mismatch, the mobile station preferably stores the following parameters:

Configuration message sequence number (CONFIG_MSG_SEQ$_s$=CONFIG_MSG_SEQ$_r$, SYS_PAR_MSG_SEQ$_s$=CONFIG_MSG_SEQ$_r$)

Whenever an Access Parameters Message is received on the Paging Channel, the sequence number, ACC_MSG_SEQ$_r$, is compared to ACC_MSG_SEQ$_s$. If the comparison results in a match, the mobile station preferably ignores the message. If the comparison results in a mismatch, the mobile station processes the remaining fields in the message. If the comparison results in a mismatch, the mobile station preferably stores the following parameter:

Access Parameters Message sequence number (ACC_MSG_SEQ$_s$=ACC_MSG_SEQ$_r$)

Whenever a valid Neighbor List Message is received on the current Paging Channel, the configuration message sequence number, CONFIG_MSG_SEQ$_r$, is preferably compared to that stored in NGHBR_LST_MSG_SEQ$_s$. If the comparison results in a match, the mobile station ignores the message. If the comparison results in a mismatch, the mobile station processes the remaining fields in the message. If the comparison results in a mismatch, the mobile station preferably stores the following parameter:

Configuration message sequence number (CONFIG_MSG_SEQ$_s$=CONFIG_MSG_SEQ$_r$, NGHBR_LST_MSG_SEQ$_s$=CONFIG_MSG_SEQ$_r$)

Whenever a CDMA Channel List Message is received on the Paging Channel, the configuration message sequence number, CONFIG_MSG_SEQ$_r$, is preferably compared to that stored in CHAN_LST_MSG_SEQ$_s$. If the comparison results in a match, the mobile station preferably ignores the message. If the comparison results in a mismatch, the mobile station processes the remaining fields in the message. If the comparison results in a mismatch, the mobile station preferably stores the following parameter:

Configuration message sequence number (CONFIG_MSG_SEQ$_s$=CONFIG_MSG_SEQ$_r$, CHAN_LST_MSG_SEQ$_s$=CONFIG_MSG_SEQ$_r$)

Whenever an Extended System Parameters Message is received on the Paging Channel, the configuration message sequence number, CONFIG_MSG_SEQ$_r$, is compared to that stored in EXT_SYS_PAR_MSG SEQ$_s$. If the comparison results in a match, the mobile station preferably ignores the message. If the comparison results in a mismatch, the mobile station processes the remaining fields in the message. If the comparison results in a mismatch, the mobile station preferably stores the following parameters:

Configuration message sequence number (CONFIG_MSG_SEQ$_s$=CONFIG_MSG_SEQ$_r$, EXT_SYS_PAR_MSG_SEQ$_s$s=CONFIG_MSG_SEQ$_r$)

Whenever a Global Service Redirection Message is received on the Paging Channel, the configuration message sequence number, CONFIG_MSG_SEQ$_r$, is preferably compared to that stored in GLOB_SERV_REDIR_MSG_SEQ$_s$. If the comparison results in a match, the mobile station preferably ignores the message. If the comparison results in a mismatch, the mobile station preferably stores the following parameter:

Configuration message sequence number (CONFIG_MSG_SEQ$_s$=CONFIG_MSG_SEQ$_r$, GLOB_SERV_REDIR_MSG_SEQ$_s$s=CONFIG_MSG_SEQ$_r$)

Whenever a valid Extended Neighbor List Message is received on the current Paging Channel, the configuration message sequence number, CONFIG_MSG_SEQ$_r$, is preferably compared to that stored in EXT_NGHBR_LST_MSG_SEQ$_s$. If the comparison results in a match, the mobile station preferably ignores the message. If the comparison results in a mismatch, the mobile station processes the remaining fields in the message. If the comparison results in a mismatch, the mobile station preferably stores the following parameters:

Configuration message sequence number (CONFIG_MSG_SEQ$_s$=CONFIG_MSG_SEQ$_r$, EXT_NGHBR_LST_MSG_SEQ$_s$=CONFIG_MSG_SEQ$_r$, NGHBR_LST_MSG_SEQ$_s$=CONFIG_MSG_SEQ$_r$)

Whenever a valid General Neighbor List Message is received on the current Paging Channel, the configuration message sequence number, CONFIG_MSG_SEQ$_r$ is preferably compared to that stored in GEN_NGHBR_LST_MSG_SEQ$_s$. If the comparison results in a mismatch, the mobile station processes the remaining field in the message. If the comparison results in a mismatch, the mobile station preferably stores the following parameters:

Configuration message sequence number (CONFIG_MSG_SEQ$_s$=CONFIG_MSG_SEQ$_r$, GEN_NGHBR_LST_MSG_SEQ$_s$=CONFIG_MSG_SEQ$_r$).

Whenever the mobile station receives a General Page Message, the mobile station preferably compares the configuration message sequence number, CONFIG_MSG_SEQ$_r$, to CONFIG_MSG_SEQ$_s$. If the comparison results in a mismatch, the mobile station sets CONFIG_MSG_SEQ$_s$ to CONFIG_MSG_SEQ$_r$.

TR45.5 has adopted a Quick Paging Channel (QPCH) approach to increase mobile station battery life in the next version of TIA/EIA-95-B. This next version is commonly known as cdma2000. The QPCH as well as the paging channel (PCH) in the cdma2000 standard are channels broadcast on a common frequency spectrum of a CDMA communications system. A pilot channel is also broadcast. As is well-known, the channels may be associated with Walsh codes or other unique spreading codes. The QPCH reduces the amount of time a mobile station is awake. As used herein, a mobile station is awake when it is consuming power from a power source to demodulate a channel using a radio frequency receiver and demodulation hardware. As used herein, the term "wake up" is used to mean activation of, and application of a power source to, hardware necessary for demodulating a paging signal. Similarly the terms "sleep" and "go to sleep" refer to the deactivation of the hardware for the purpose of conserving a power source in the mobile station.

No error correction coding or interleaving is used for the paging indicator bits. Consequently, the time awake to receive the bit is small compared to the time awake to receive the regular paging channel slot. A paging indicator bit indicates to the mobile station whether it is to wake up for its paging channel slot to receive a page. On-off keying is used by the base station to transmit the QPCH bits. For example, for one value the base station transmits a spread spectrum signal at a given power level during the bit time period using a particular spreading code and for the other value the base station does not transmit any power during the bit time period using the particular spreading code.

When the mobile station receives a QPCH bit, there are preferably three possibilities: "ON", "OFF", or "not certain". "ON" means that the base station clearly transmitted the bit. "OFF" means that the base station clearly did not transmit the bit. "Not certain" means that the mobile station is not certain whether or not the base station transmitted the bit. If the mobile station determines that the received power for the QPCH bit time period and spreading code is sufficiently strong, then it can be certain that the base station transmitted the bit. If the mobile station determines that the pilot power for the QPCH bit time period is sufficiently strong and that there is little received power for the QPCH bit time period and spreading code, then it can be certain that the base station did not transmit the bit. If the mobile station determines that the pilot power for the QPCH bit time period is not sufficiently strong, the mobile station cannot be certain whether or not the base station transmitted the bit.

Figure 1:
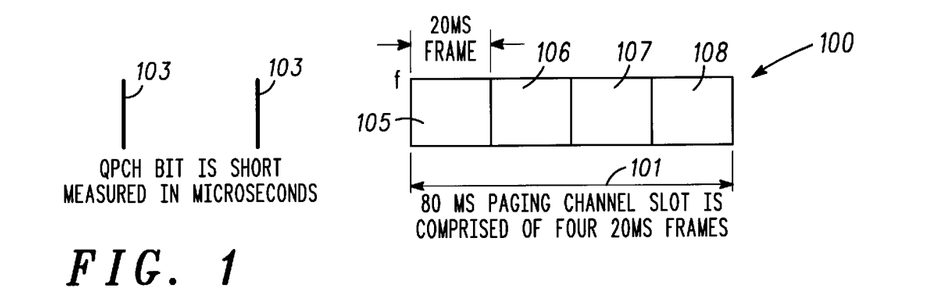
FIG. 1 depicts a quick paging channel in accordance with a preferred embodiment of the present invention.

The present invention can be better understood with reference to FIGS. 1–7. FIG. 1 depicts a quick paging channel 100 in accordance with a preferred embodiment of the present invention. Quick Paging Channel 100 is preferably divided into 80 ms slots 101 called Quick Paging Channel slots. Associated with a mobile station's "regular" 80 ms paging channel (PCH) slot 101 is a Quick Paging Channel (QPCH) slot 103. The beginning of a QPCH slot 103 preferably occurs 100 ms earlier in time than the beginning of the associated PCH slot 101. Each QPCH slot 103 is preferably divided into four 20 ms frames 105–108. In a QPCH slot 103, a mobile station's first paging indicator bit will preferably be in one of the first two 20 ms frames 105 or 106 of the QPCH slot 103. A mobile station's second paging indicator bit will preferably occur in the frame two frames after the frame containing the mobile station's first paging indicator bit.

Figure 2:
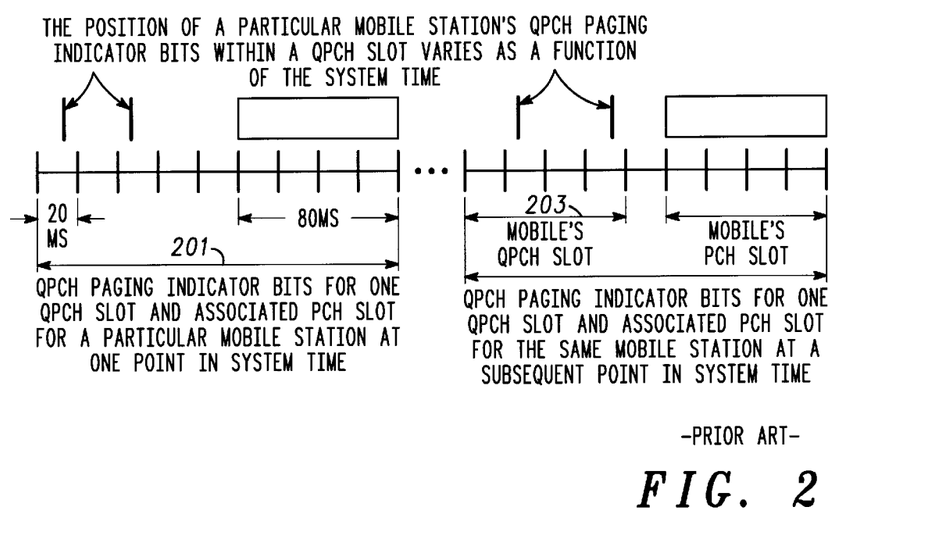
FIG. 2 depicts bit positions of a mobile station's quick paging channel paging indicator bits in accordance with the prior art.

FIG. 2 shows an example of the bit positions of a mobile station's QPCH paging indicator bits 201 in accordance with the prior art. It should be noted that the positions of a mobile station's QPCH paging indicator bits 201 within a QPCH slot 203 vary as a function of the system time.

In order to ensure that stored configuration parameter values are up-to-date for mobile stations monitoring the QPCH paging indicator bits 201, it has been proposed that the base station, after updating the overhead configuration information, sets all QPCH paging indicator bits 201 to "ON" for an amount of time which is a function of the maximum slot cycle index. In the preferred embodiment, the amount of time is 1.28 seconds if the maximum slot cycle index is set to 0. In alternate embodiments of the present invention, the amount of time could be 2.56 or 3.84 seconds if the maximum slot cycle index is set to 0, or 2.56, 5.12, or 7.68 seconds if the maximum slot cycle index is set to 1.

When a mobile station is in idle mode and is monitoring a paging channel or quick paging channel, it measures the strengths of pilot signals of neighboring base stations. When a mobile station determines that a neighboring pilot signal is sufficiently stronger than the pilot signal associated with the base station whose paging channel or quick paging channel is being monitored, it performs a handoff to the neighboring base station to monitor the paging channel and quick paging channel of the neighboring base station. This type of handoff is called an idle handoff.

According to TIA/EIA-95-B and the proposed cdma2000 standard, mobile stations have a 10 minute timer for remembering stored configuration parameter values when performing idle handoffs from cell to cell. For example, if a mobile station receives configuration parameter values from cell A, performs an idle handoff to cell B, then 5 minutes later performs an idle handoff back to cell A, the mobile station retrieves its stored configuration parameter values. The mobile station need not waste its battery or other power source receiving the configuration parameter values again if a sequence number, such as the CONFIG_MSG_SEQ in a configuration message or General Page Message, still matches the stored value for the cell. According to TIA/EIA-95-B, a mobile station updates its configuration parameter values by receiving the paging channel over which configuration parameter messages are sent for a period of time until all configuration parameters are up-to-date. Cdma2000 mobile stations may also update configuration parameters by receiving a paging channel. Another possibility is to update configuration parameters by receiving a special broadcast channel (BCCH), over which configuration parameter messages are sent for a period of time, until all configuration parameters are up-to-date. The BCCH is a channel similar to the PCH and is spread in a similar manner and is typically broadcast in the same frequency spectrum.

Because the base station, when updating its configuration parameter values, preferably sets all QPCH paging indicator bits to "ON" for a short time compared to 10 minutes, when a mobile station performs an idle handoff back to a cell for which it has stored overhead information, it would have to wake up for a paging channel slot in order to insure that its overhead information is up-to-date. This time ranges from 20 ms to 160 ms. Waking up for such a relatively long time defeats the purpose of the QPCH. Idle handoffs can be quite frequent in the soft handoff region between cells, and are wasteful of the battery or other power source. On the other hand, if the mobile station were to begin monitoring the quick paging bits immediately after idle handoff without checking for a configuration change, the result could be a lost mobile station, i.e. a mobile station which does not respond when paged. For example, if the channel configuration changed, the mobile station could be monitoring the wrong channel. Also, if the power level of the QPCH were lowered, the mobile station might not respond when paged. Quickly updating the mobile when the overhead information changes is critical.

Preferably the mobile station would be able to determine immediately after the idle handoff if configuration information has changed without waking up for a paging channel slot.

Figure 3:
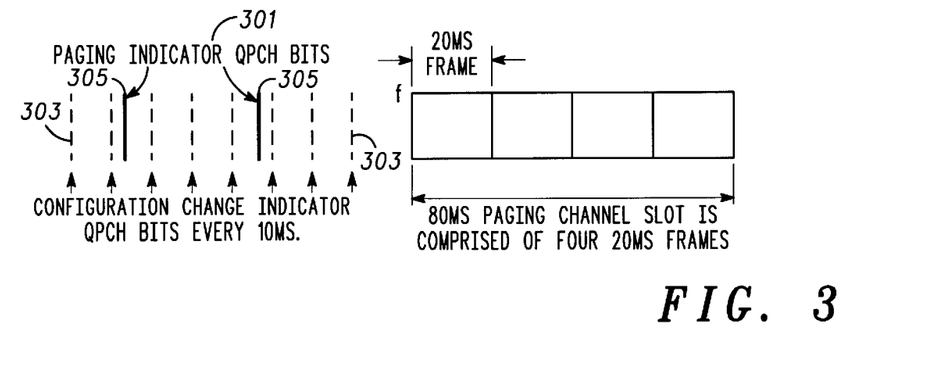
FIG. 3 depicts a quick paging channel including a configuration change indicator every 10 ms in accordance with a preferred embodiment of the present invention.

In the preferred embodiment of the present invention as depicted in FIG. 3, every 10 ms one QPCH bit 301 is reserved as a Configuration Change indicator bit 303. In the alternate embodiment of the present invention, a QPCH bit is reserved as a Configuration Change indicator bit every 5 ms. In a further alternate embodiment, a QPCH bit is reserved as a Configuration Change indicator bit every 20 ms. When the base station changes the configuration parameter values, it preferably sets all Configuration Change indicator bits 303, also transmitted using On-Off Keying as with paging indicator QPCH bits, to "ON" preferably for 10 minutes after changing the configuration information. It should be noted that this is in addition to setting all paging indicator bits for the maximum slot cycle.

When a mobile station performs an idle handoff, it receives at least one configuration change indicator bit 303 for the new base station if the ten minute timer for the new base station has not expired. In an alternate embodiment, the mobile station can receive and combine multiple configuration change quick bits. This is helpful in RF conditions where the signal from the base station is weak and the mobile station could not otherwise be confident that the configuration is not being changed.

In addition, the mobile station receives one or two paging indicator bits 305. If the mobile station is confident that there is no page and is confident that there was no configuration change, it will go to sleep until the next quick paging slot. It should be noted that Configuration Change indicator bit 303 is only monitored by the mobile after an idle handoff; once the mobile is confident that there is no change in configuration, it does not have to receive a configuration change bit 303 in a subsequent quick paging slot. This is an important feature of the invention because power is consumed monitoring the configuration change quick bit only for the first quick paging slot after an idle handoff. If the mobile station determines that the configuration has changed after receiving a configuration change quick bit, it will wake up for its regular paging slot and stay awake until it the configuration parameter values are up-to-date. Consequently, the present invention provides a greatly enhanced battery life by waking up the mobile station only when necessary to receive up-to-date configuration parameters.

If a broadcast channel (BCCH) is used and the mobile station determines that the configuration has changed after receiving configuration change indicator bit 303, the mobile station wakes up and receives the BCCH until the configuration parameter values are up-to-date. If the mobile station does not support simultaneous demodulation of a BCCH and a PCH, the mobile station wakes up and receives its PCH slot first if required based upon the paging indicator bits, then receives the BCCH. This method can also prevent the mobile station from missing a page. Preferably, a mobile station supports simultaneous demodulation of a BCCH and a PCH; in this case the mobile would receive the BCCH and simultaneously receive the PCH if required based upon the paging indicator bits. Simultaneous demodulation of the PCH and BCCH can be used to conserve the battery or other power source by minimizing the amount of time the radio receiver and associated hardware are on and consuming power.

If the valid configuration parameters timer for the new base station has expired when the mobile determines that it needs to perform an idle handoff to the new base station, the mobile station should conserve the battery or other power source by not waking up to receive either the paging indicator bits or the configuration change indicator bits. This applies when there is no BCCH and only a PCH. If a BCCH is configured in this case, the mobile station preferably wakes up for the BCCH without waking up for the configuration change indicators. Alternately, the mobile station may receive the paging indicator bits to determine whether to wake up for the PCH.

Figure 4A:
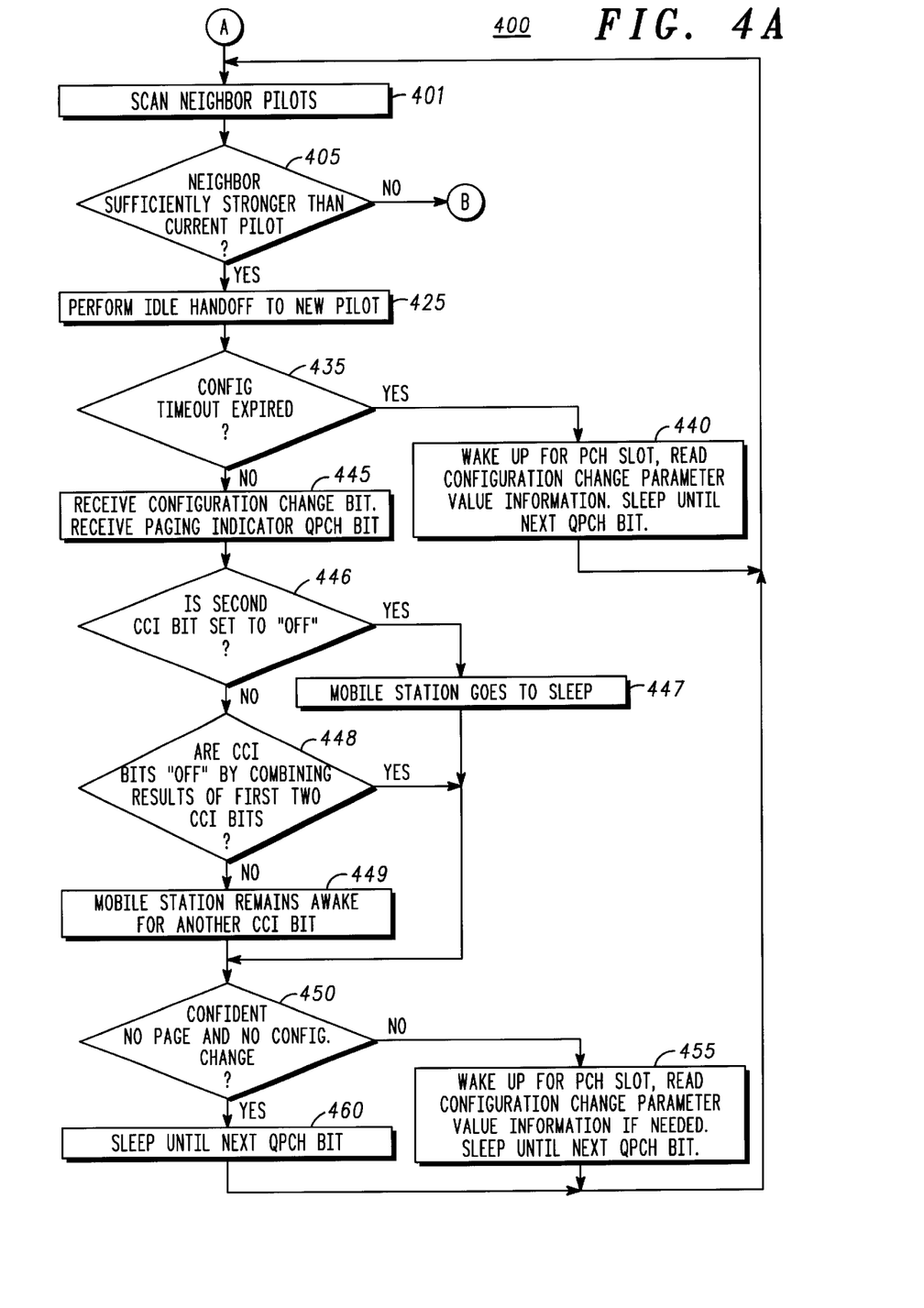
FIG. 4 depicts a flowchart for determining whether to wake up a mobile station in accordance with a preferred embodiment of the present invention.
Figure 4B:
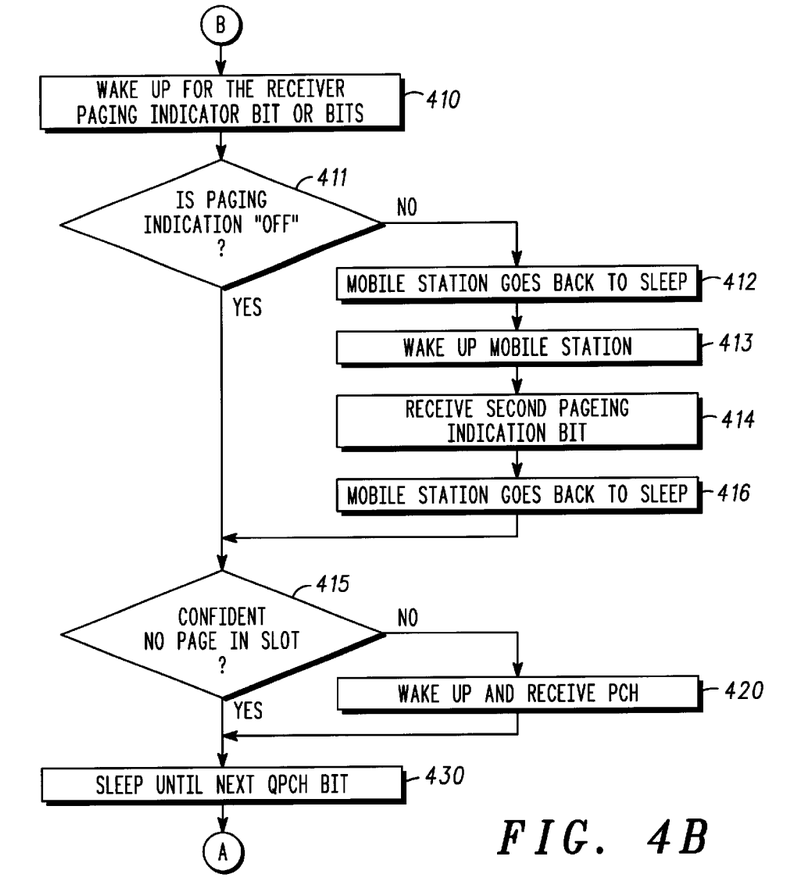

FIG. 4 depicts a flowchart 400 of the mobile station procedure. The mobile station scans (401) the neighbor pilots by waking up and measuring the pilot strengths of the neighboring pilots. The mobile station determines (405) if a neighboring pilot is sufficiently stronger than the currently monitored pilot. If the result of step 405 is negative, the mobile station proceeds to step 410; otherwise the mobile station proceeds to step 425. The mobile station wakes up and receives (410) the first paging indicator bit. If the mobile station determines (411) that the first paging indicator bit is "OFF", the mobile station proceeds to step 415. If the first paging indicator bit is not "OFF", the mobile station goes (412) back to sleep, then wakes up (413) again and receives (414) the second paging indicator bit, then goes (416) back to sleep and proceeds to decision step 415.

The mobile station then determines (415) if it is confident that there is no page in the following PCH slot. If the mobile determines that either of the paging indicator bits was "OFF", then the result of decision step 415 is positive and the mobile station proceeds to step 430. If neither paging indicator bit was "OFF", the result is negative and the mobile station wakes up (420) and receives the PCH until it either receives a page directed to it or until it determines that there are no pages for it in the PCH slot. The mobile station then proceeds to step 430. The mobile station sleeps (430)

until the next QPCH bit it must receive; when the mobile station wakes up for the next QPCH bit this may be several ms earlier than the QPCH bit to allow enough time for neighbor searching. After step 430 the mobile station proceeds back to step 401.

If the neighbor pilot is sufficiently stronger than the current pilot as determined at step 405, the mobile station performs (425) the idle handoff to the new pilot. The mobile station then determines (435) whether its configuration parameter value timer has expired for the new base station. If the result of this step is positive, the mobile station wakes up (440) and receives the updated configuration parameters. This is preferably accomplished without receiving the configuration change indicator, because to receive the configuration change indicator would consume power from the battery or other power source when the mobile station has no choice but to wake up to receive the configuration parameters. After receiving the updated configuration parameters the mobile station then goes to sleep until the next QPCH bit as in step 430. The mobile station then proceeds back to step 401.

If the configuration timeout has not expired as determined at step 435, the mobile station receives (445) configuration change indicator bits and paging indicator bits on the QPCH as necessary. Reception of paging indicator bits is performed in a similar manner as in steps 410, 411, 412, 413, 414, and 415. If there is no BCCH and the mobile station does not determine that that one of the paging indicator bits is off, it can avoid being awake for the configuration change indicator bit since it must in this case wake up for the PCH slot anyway. Typically, however, the mobile station would receive at least one paging indicator bit and at least one configuration change indicator bit. Preferably the mobile station receives the first paging indicator and, after receiving it, stays awake until the next scheduled configuration change indicator bit, receives it, and then goes back to sleep. If the mobile station does not determine that the first paging indicator is set to "OFF", the mobile station then wakes up in time to receive the second paging indicator. If the mobile station receives the second paging indicator, determines that it is set to "OFF", but did not determine that the first received configuration change indicator bit was set to "OFF", the mobile station stays awake to receive a second configuration change indicator bit. This is preferably the next scheduled configuration change indicator bit.

If the mobile station determines (446) that the second configuration change indicator bit is set to "OFF", it preferably goes (447) to sleep and then proceeds to step 450. If the mobile station determines (446) that the second configuration change indicator bit is not set to "OFF", the mobile station determines (448) whether the configuration change bits are "OFF" by combining the results of the first two configuration change indicator bits. If, after combining the two configuration change indicator bits the mobile station is confident there has not been a configuration change, it preferably goes to sleep and proceeds to step 450. If the mobile station determines (448) that the configuration change indicator bits are not "OFF", the mobile station preferably remains awake (449) for yet another configuration change bit, reevaluates, and so on. Alternately, or it may go back to sleep even though it is not confident that there has been a configuration change. If the mobile station receives a configuration change indicator bit at any time and determines that it is "ON", it need not stay awake for the sake of receiving another configuration change indicator bit. After receiving configuration change indicator bits and paging indicator bits as needed, the mobile station proceeds to decision step 450.

The mobile station then determines (450) if it is confident that there is no page in the slot and if it is confident that there has not been a configuration change. If the result of step 450 is positive, the mobile station sleeps (460) until the next QPCH bit as in step 430 and then proceeds back to step 401. If the mobile station is not confident that there is no page and no configuration change, the mobile station wakes up (455) and makes sure that it has up-to-date configuration parameter values if it is not confident that there has not been a configuration change. The mobile station also must stay awake for its paging channel slot until it either receives a page directed to it or until it determines that there are no pages for it in the PCH slot. After the mobile is sure that its configuration parameter values are up-to-date and there are no pages for it, it sleeps until the next QPCH bit as in step 430 then proceeds to step 401.

When the base station updates its configuration parameter value information, it preferably sets all QPCH paging indicator bits to "ON" for an amount of time which is a function of the maximum slot cycle index. If the change in configuration parameter values includes a change in the power level of the QPCH, the power level of the paging indicator bits for this time period is set to the old QPCH power level. This is particularly important in order to ensure that mobile stations monitoring the QPCH paging indicators wake up to receive the new parameters when the power of the QPCH is being reduced. If the reduced power level were used immediately, the mobile stations could become "lost" because they are unaware of the configuration change. After this time period, the new power level of the paging indicator bits may be used.

Similarly, when the base station updates its configuration parameter value information, it sets all Configuration Change indicator bits to "ON" for a predetermined amount of time, preferably for ten minutes after changing the configuration information. If the change in configuration parameter values includes a change in the power level of the QPCH, the power level of the configuration change indicator bits for this time period is set to the old QPCH power level. This is particularly important in order to ensure that mobile stations monitoring the QPCH configuration change indicators after an idle handoff wake up to receive the new parameters when the power of the QPCH is being reduced. If the reduced power level were used immediately, the mobile stations might become "lost" because they are unaware of the configuration change. After this time period, the new power level of the configuration change indicator bits is preferably used.

The following operators define mathematical operations:

× indicates multiplication.

$\lfloor x \rfloor$ indicates the largest integer less than or equal to x: $\lfloor 1.1 \rfloor = 1$, $\lfloor 1.0 \rfloor = 1$.

$\lceil x \rceil$ indicates the smallest integer greater or equal to x: $\lceil 1.1 \rceil = 2$, $\lceil 2.0 \rceil = 2$.

$|x|$ indicates the absolute value of x: $|-17| = 17$, $|17| = 17$.

⊕ indicates exclusive OR (modulo-2 addition).

min (x, y) indicates the minimum of x and y.

max (x, y) indicates the maximum of x and y.

x mod y indicates the remainder after dividing x by y: $x \bmod y = x - (y \times \lfloor x/y \rfloor)$.

If the mobile station supports the Quick Paging Channel operation, the mobile station monitors the Paging Channel in certain slots assigned to it, as described below. Otherwise, the mobile station monitors the Paging Channel in each of its assigned slots. For its assigned slots, the mobile station will begin monitoring the Paging Channel in time to receive the first bit of the slot. If the mobile station is not configured to receive broadcast addresses, the mobile station will continue to monitor the Paging Channel until predetermined conditions are satisfied.

The Quick Paging Channel is preferably divided into 80 ms slots called Quick Paging Channel slots. The Quick Paging Channel protocol provides for scheduling the transmission of paging indicators for a mobile station in Quick Paging Channel slots assigned to the mobile station. The Quick Paging Channel protocol also preferably provides for scheduling the transmission of configuration change indicators for mobile stations in Quick Paging Channel slots.

Figure 5:
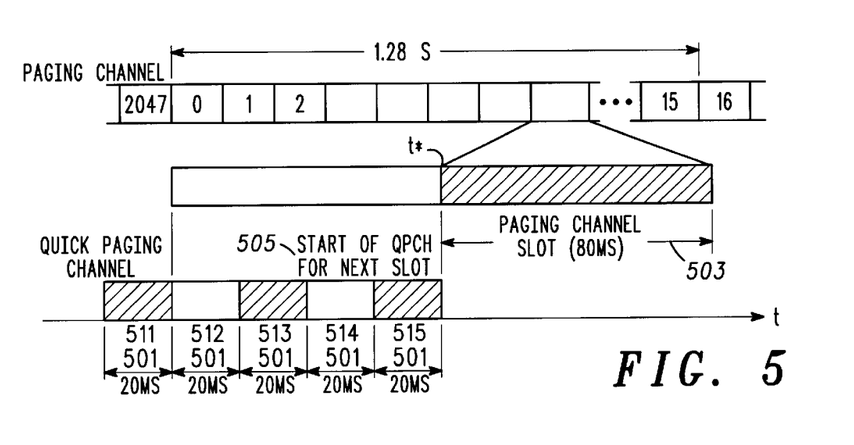
FIG. 5 depicts a quick paging channel timeline in accordance with a preferred embodiment of the present invention.

FIG. 5 depicts a quick paging channel timeline in accordance with a preferred embodiment of the present invention. If the mobile station is operating in the slotted mode and it supports the Quick Paging Channel, the mobile station monitors paging indicators on the Quick Paging Channel as follows. Quick Paging Channel slots 501 are offset from Paging Channel slots 503 by 20 ms. The Quick Paging Channel slot 501 immediately preceding the mobile station's assigned Paging Channel slot 503 is the mobile station's assigned Quick Paging Channel slot 505. In the preferred embodiment of the present invention, two paging indicators are assigned to a mobile station in its assigned Quick Paging Channel slot 505.

In the following example, t* is the start time of the mobile station's assigned Paging Channel slot 503. Paging indicators are preferably assigned as follows. The first paging indicator for the mobile station is preferably assigned between (t*−100 ms) and (t*−80 ms), marked as 511, and the second paging indicator is assigned between (t*−60 ms) and (t*−40 ms), marked as 513. Alternately, the first paging indicator for the mobile station is assigned between (t*−80 ms) and (t*−60 ms), marked as 512, and the second paging indicator is assigned between (t*−40 ms) and (t*−20 ms), marked as 514.

If the mobile station is operating in the slotted mode and it supports the Quick Paging Channel, the mobile station preferably, when performing an idle handoff to a base station whose paging channel has recently been monitored, monitors one or more configuration change indicators. Configuration change indicators are preferably scheduled every 10 ms on the Quick Paging Channel.

A mobile station operating in the slotted mode preferably monitors the paging indicators in the mobile station's assigned Quick Paging Channel slot 505 if the mobile station supports the Quick Paging Channel and the mobile station is not monitoring the Paging Channel. Otherwise the mobile station monitors the assigned paging channel slot 503 associated with the Quick Paging Channel slot 505.

The mobile station's assigned Quick Paging Channel slots 505 are preferably those slots in which:

$$(\lfloor(t-5)/4\rfloor - \text{PGSLOT}) \bmod (16 \times T) = 0.$$

where t is the System Time in frames, PGSLOT is preferably selected in the range 0 to 2047, and T is the slot cycle length, preferably in units of 1.28 seconds such that:

$$T = 2^i,$$

and i is the slot cycle index.

To determine the position of the mobile station's two assigned paging indicators respective to the beginning of the mobile station's assigned Quick Paging Channel slot 501, the mobile station preferably uses the hash function specified above.

Figure 6:
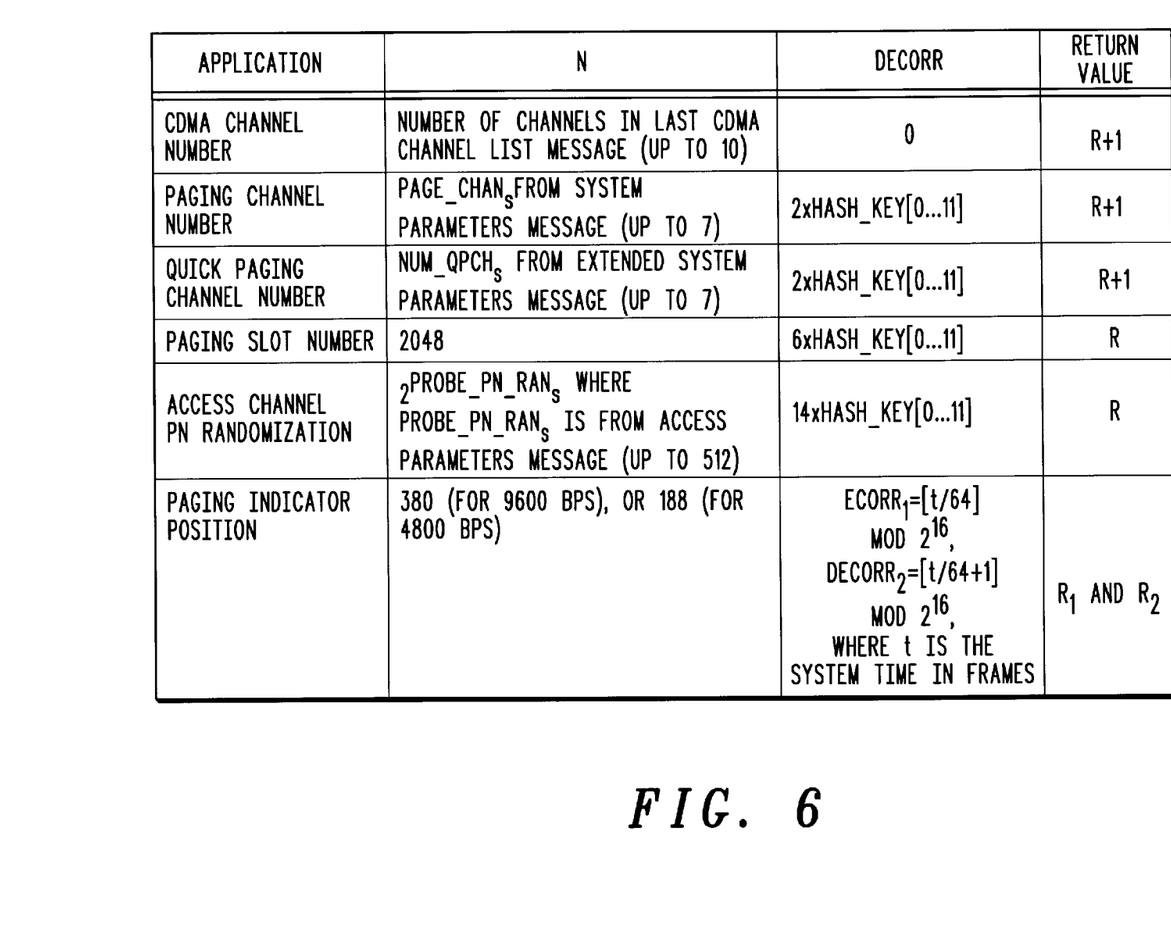
FIG. 6 depicts a hash function modifier table in accordance with a preferred embodiment of the present invention.

The mobile station preferably determines the bit position of its first assigned paging indicator with respect to the first QPCH bit in the QPCH slot 501 according to the following formula:

$$1 + \lfloor (R_1)/(N/4) \rfloor + R_1$$

where N is the value from FIG. 6 used to determine $R_1$.

The mobile station preferably determines the bit position of its second assigned paging indicator with respect to the first QPCH bit in QPCH slot 501 according to the following formula:

$$1 + \lfloor (R_2)/(N/4) \rfloor + R_2$$

where N is the value from FIG. 6 used to determine $R_2$.

The preferred method of the present invention occurs as follows. The mobile station receives its first assigned paging indicator. If the mobile station does not detect that the first assigned paging indicator is "OFF", the mobile station receives the second paging indicator. If the mobile station does not detect that the second assigned paging indicator is "OFF", the mobile station preferably receives its assigned Paging Channel slot immediately following its assigned Quick Paging Channel slot.

Before performing an idle handoff to a base station whose paging channel was recently monitored, a mobile station operating in the slotted mode preferably monitors one or more configuration change indicators on the assigned Quick Paging Channel for the new base station if the mobile station supports the Quick Paging Channel, the new base station supports Quick Paging Channel, the mobile station is not monitoring the Paging Channel, and no more than 600 seconds have elapsed since the mobile station last received a valid message on the new Paging Channel.

The mobile station preferably determines the bit positions of its configuration change indicator bits with respect to the first QPCH bit in a QPCH slot according to the following formula:

$$((N/4) + 1) \times P$$

where N is the value from FIG. 6 used to determine $R_1$ and $R_2$, and where P preferably ranges from 0 to 7.

If the mobile station monitors a configuration change indicator and determines that it is set to "OFF", the mobile station preferably avoids entering the non-slotted mode after an idle handoff.

While performing an idle handoff, if the mobile station supports the Quick Paging Channel operation and the mobile station determines that the QPCH configuration change indicator for the new QPCH is set to "OFF" and if no more than 600 seconds have elapsed since the mobile station last received a valid message on the new Paging Channel, the mobile station preferably does not begin operating in the non-slotted mode after the idle handoff. Otherwise the mobile station will operate in the non-slotted mode until the mobile station has received at least one valid configuration message, or General Page Message, on the new Paging Channel. Following the reception of this message the mobile station may resume slotted mode operation.

After performing an idle handoff, the mobile station preferably discards all unprocessed messages received on the old Paging Channel.

If the mobile station enters the non-slotted mode, the mobile station sets CONFIG_MSG_SEQ$_s$ to NULL; otherwise, the mobile station sets CONFIG_MSG_SEQ$_s$ to the stored information for the new Paging Channel. If the mobile station has not stored configuration parameters for the new Paging Channel, or if the stored information is not current, the mobile station sets SYS_PAR_MSG_SEQ$_s$, NGHBR_LST_MSG_SEQ$_s$, EXT_NGHBR_LST_MSG_SEQ$_s$, GEN_NGHBR_LST_MSG_SEQ$_s$, CHAN_LST_MSG_SEQ$_s$, EXT_SYS_PAR_MSG_SEQ$_s$, and GLOB_SERV_REDIR_MSG_SEQ$_s$ to NULL.

Certain procedures require a uniform distribution of mobile stations among N resources. The following function returns an integer, using as arguments the mobile station's IMSI or ESN, the number of resources N, and a modifier DECORR. The modifier serves to decorrelate the values obtained for the various applications from the same mobile station.

If the hashing function is to be used for determining the Access Channel PN Randomization, HASH_KEY shall be equal to the mobile station ESN. Otherwise, HASH_KEY is preferably equal to the 32 least significant bits of IMSI_O_S1+$2^{24}$×IMSI_O_S2).

Define:
Word L to be bits 0–15 of HASH_KEY
Word H to be bits 16–31 of HASH_KEY
where bit 0 is the least significant bit of HASH_KEY. The hash value is computed as follows:

$$R=\lfloor N\times((40503\times(L\oplus H\oplus DECORR))\bmod 2^{16})/2^{16}\rfloor.$$

For determining mobile station's assigned paging indication bit positions, the hash value is computed as follows:

$$R_1=\lfloor N\times((40503\times(L\oplus H\oplus DECORR_1))\bmod 2^{16})/2^{16}\rfloor,$$

and $$R_2=\lfloor (N/2)\times((40503\times(L\oplus H\oplus DECORR_2))\bmod 2^{16})/2^{16}\rfloor+N+\lfloor(2\times R_1)/N\rfloor\times(N/2).$$

The mobile station preferably chooses the range N and the modifiers DECORR, DECORR$_1$, and DECORR$_2$ according to the application as shown in FIG. 6. In the table, HASH_KEY [0 . . . 11] denotes the 12 least significant bits of HASH_KEY.

The base station may support a Quick Paging Channel. When a Quick Paging Channel is supported, the base station transmits paging indicators to the mobile station in the assigned positions in the assigned Quick Paging Channel slot. The base station sets the paging indicators to "ON" if the mobile station is to receive the Paging Channel in the Paging Channel slot following its assigned Quick Paging Channel slot.

If the base station operates with a Quick Paging Channel, after any configuration parameter value is updated, the base station preferably sets all paging indicators to "ON" for each Quick Paging Channel slot for a time interval of T units of 1.28 seconds, where:

$$T=N\times 2^{MAX\_SLOT\_CYCLE\_INDEX}$$

and N is an integer greater than or equal to 1.

If the base station operates with a Quick Paging Channel, after any configuration parameter value is updated, the base station preferably sets all configuration change indicators to "ON" for each Quick Paging Channel slot for a time interval of 600 seconds. At all other times, the base station sets all configuration change indicators to "OFF."

To determine the mobile station's assigned Quick Paging Channel, the base station preferably uses the hash function specified in FIG. 6 with the following inputs. IMSI_S based on the IMSI with which the mobile station registered and the number of Quick Paging Channels which the base station transmits on the mobile station's assigned CDMA Channel.

In the preferred embodiment, the mobile station's assigned Quick Paging Channel slots are those slots for which $$(\lfloor(t-5)/4\rfloor-\text{PGSLOT})\bmod(16\times T)=0,$$

where t is the System Time in frames, PGSLOT is selected preferably in the range 0 to 2047 by using hash function specified in FIG. 6, and T is the slot cycle length, preferably in units of 1.28 seconds such that $$T=2^i,$$

and i is the slot cycle index.

To determine the mobile station's assigned paging indicators, the base station preferably uses the same formula as used by the mobile station. To determine the position of the configuration change indicators, the base station preferably uses the same formula as used by the mobile station.

Figure 7:
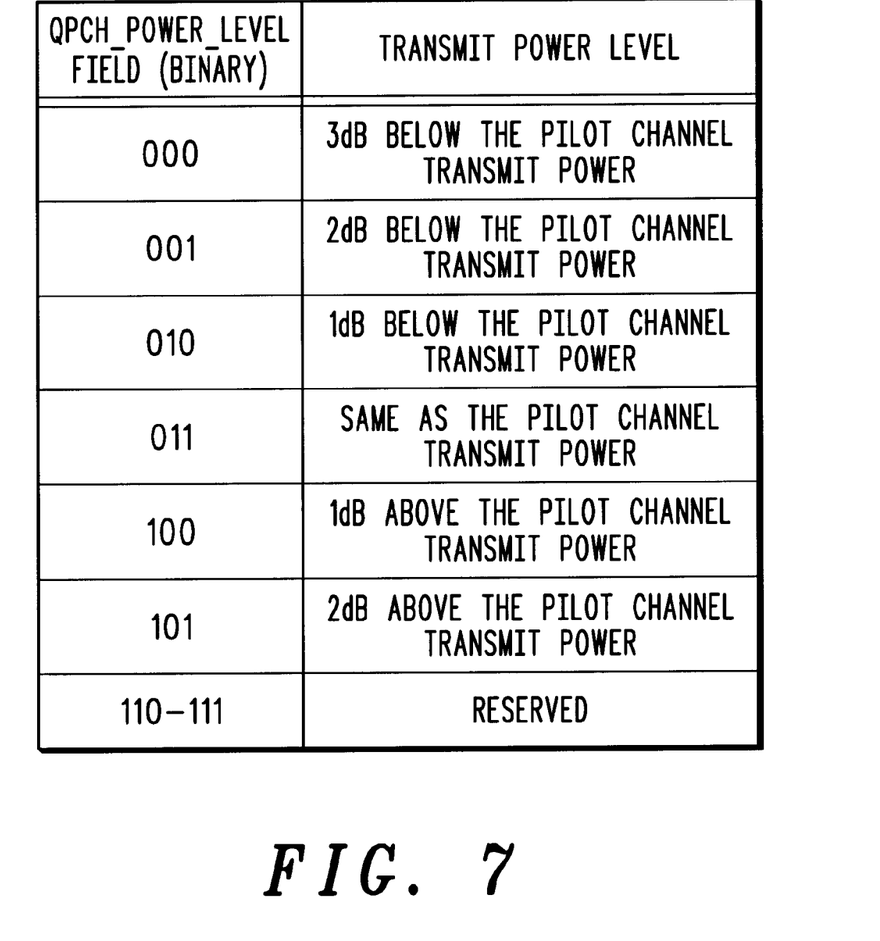
FIG. 7 depicts a table showing the transmit power level associated with a QPCH power level field in accordance with a preferred embodiment of the present invention.

If the base station sets QPCH_SUPPORTED to '1', the base station shall set this field to the Quick Paging Channel transmit power level relative to that of the Pilot Channel as specified in FIG. 7.

While this invention has been described in terms of certain examples thereof, it is not intended that it be limited to the above description, but rather only to the extent set forth in the claims that follow.

I claim:

1. A method for updating configuration parameters at a mobile station, the method comprising the steps of:
   storing, at the mobile station, first configuration parameters from a first base station;
   performing an idle handoff of the mobile station from the first base station to a second base station, the second base station having second configuration parameters associated therewith;
   updating configuration parameters at the mobile station from the first configuration parameters to the second configuration parameters;
   performing an idle handoff of the mobile station from the second base station to the first base station; and
   receiving at least one configuration change indicator to indicate whether current configuration parameters associated with the first base station are different from the first configuration parameters.

2. A method for updating configuration parameters at a mobile station in accordance with claim 1, the method further comprising the step of receiving the current configuration parameters.

3. A method for updating configuration parameters at a mobile station in accordance with claim 1, wherein the second configuration parameters are distinct from the first configuration parameters.

4. A method for updating configuration parameters at a mobile station in accordance with claim 1, wherein the mobile station determines, after the idle handoff, if configuration information has changed without waking up for a paging channel slot.

5. A method for updating configuration parameters at a mobile station in accordance with claim 1, wherein when a mobile station performs an idle handoff, the mobile station receives at least one configuration change indicator bit for the new base station if a timer associated with the new base station has not expired.

6. A method for updating configuration parameters at a mobile station in accordance with claim 1, wherein, when a timer for the new base station has expired when the mobile determines that it needs to perform an idle handoff to the new base station, the mobile station does not wake up to receive at least one configuration change indicator bit.

7. A method for updating configuration parameters at a mobile station in accordance with claim 6, wherein the mobile station does not wake up when there is no BCCH and only a PCH.

8. A method for updating configuration parameters at a mobile station in accordance with claim 1, wherein the mobile station performs the idle handoff to the base station associated with the new pilot.

9. A method for updating configuration parameters at a mobile station in accordance with claim 8, further comprising the step of determining, at the mobile station, whether its configuration parameter value timer has expired for the new base station.

10. A method for updating configuration parameters at a mobile station in accordance with claim 9, wherein, if the configuration parameter value timer has expired for the new base station, the mobile station wakes up and receives the updated configuration parameters.

11. A method for updating configuration parameters at a mobile station in accordance with claim 1, wherein the mobile station does not receive the configuration change indicator.

12. A method for updating configuration parameters at a mobile station in accordance with claim 1 wherein, before performing an idle handoff to a base station whose paging channel was recently monitored, a mobile station operating in the slotted mode monitors one or more configuration change indicators on the assigned Quick Paging Channel for the new base station if the mobile station supports the Quick Paging Channel.

13. A method for updating configuration parameters at a mobile station in accordance with claim 12, wherein the new base station supports Quick Paging Channel.

14. A method for updating configuration parameters at a mobile station in accordance with claim 12, wherein the mobile station is not monitoring the Paging Channel.

15. A method for updating configuration parameters at a mobile station in accordance with claim 12, wherein no more than about 600 seconds have elapsed since the mobile station last received a valid message on the new Paging Channel.

16. A method for updating configuration parameters at a mobile station in accordance with claim 1, wherein, while performing an idle handoff, if the mobile station supports the Quick Paging Channel operation and the mobile station determines that the QPCH configuration indicator for the new QPCH is set to "OFF" and if no more than about 600 seconds have elapsed since the mobile station last received a valid message on the new Paging Channel, the mobile station does not begin operating in the non-slotted mode after the idle handoff.

* * * * *